US012277572B2

(12) United States Patent
Munjal

(10) Patent No.: US 12,277,572 B2
(45) Date of Patent: *Apr. 15, 2025

(54) SYSTEM AND METHOD FOR USING DATA POINTS COLLECTED FROM A CUSTOMER TO PROVIDE CUSTOMER SPECIFIC OFFERINGS

(71) Applicant: Transform SR Brands LLC, Hoffman Estates, IL (US)

(72) Inventor: Leena Munjal, Algonquin, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 775 days.

This patent is subject to a terminal disclaimer.

(21) Appl. No.: 17/134,637

(22) Filed: Dec. 28, 2020

(65) Prior Publication Data

US 2021/0118003 A1 Apr. 22, 2021

Related U.S. Application Data

(63) Continuation of application No. 14/060,327, filed on Oct. 22, 2013, now Pat. No. 10,902,448, which is a
(Continued)

(51) Int. Cl.
*G06Q 30/0207* (2023.01)
*G06Q 20/18* (2012.01)
(Continued)

(52) U.S. Cl.
CPC ......... *G06Q 30/0224* (2013.01); *G06Q 20/18* (2013.01); *G06Q 20/20* (2013.01);
(Continued)

(58) Field of Classification Search
CPC ........... G06Q 30/0224; G06Q 30/0207; G06Q 30/0635; G06Q 40/12; G06Q 20/18;
(Continued)

(56) References Cited

U.S. PATENT DOCUMENTS 7,337,133 B1 2/2008 Bezos et al.
7,788,141 B1 8/2010 Sim
(Continued)

OTHER PUBLICATIONS

DeHoratius, Nicole; Raman, Ananth. Store Manager Incentive Design and Retail Performance: An Exploratory Investigation. Manufacturing & Service Operations Management; Linthicum vol. 9, Iss. 4, (Fall 2007): 518-534. (Year: 2007).*
(Continued)

*Primary Examiner* — Florian M Zeender
*Assistant Examiner* — Fawaad Haider
(74) *Attorney, Agent, or Firm* — McAndrews, Held & Malloy, Ltd.

(57) ABSTRACT

A retailer computer system receives from a first computing device a shopping recap having data indicative of one or more products that were shown to a customer by the sales associate while the customer was within a retail establishment. The received shopping recap is stored within a data repository where it is linked to a customer identifier that is associated with the customer and an associate identifier that is associated with the sale associate. If the customer later purchases a product, data indicative of the product being purchased is compared against data within any shopping recap that is linked to that customer to determine if a sales associate that is also linked to any shopping recap linked to that customer is to be awarded a commission for the product being purchased. The purchase of the product by the customer may further generate a digital receipt where the digital receipt includes a notice that the customer is being awarded an incentive, such as a coupon. The incentive may be automatically linked to a rewards account of the customer whereupon, if the customer purchases a product that is associated with the incentive, the incentive will be automatically redeemed for the customer.

20 Claims, 16 Drawing Sheets

Related U.S. Application Data continuation of application No. 13/191,918, filed on Jul. 27, 2011, now Pat. No. 8,566,167.

(51) Int. Cl.
*G06Q 20/20* (2012.01)
*G06Q 20/40* (2012.01)
*G06Q 30/0601* (2023.01)
*G06Q 40/12* (2023.01)

(52) U.S. Cl.
CPC ......... *G06Q 20/202* (2013.01); *G06Q 20/204* (2013.01); *G06Q 20/40* (2013.01); *G06Q 30/0207* (2013.01); *G06Q 30/0635* (2013.01); *G06Q 40/12* (2013.12)

(58) Field of Classification Search
CPC .... G06Q 20/20; G06Q 20/202; G06Q 20/204; G06Q 20/40
USPC .......................................................... 705/16
See application file for complete search history.

(56) References Cited

U.S. PATENT DOCUMENTS

| | | | |
|---|---|---|---|
| 2002/0004749 | A1 | 1/2002 | Aloni et al. |
| 2008/0021772 | A1 | 1/2008 | Froseth et al. |
| 2012/0191515 | A1* | 7/2012 | Katz .................. G06Q 30/0631 |
| | | | 705/26.7 |
| 2013/0080239 | A1* | 3/2013 | Okerlund ............. G06Q 20/387 |
| | | | 705/14.27 |

OTHER PUBLICATIONS

Dehoratius, Nicole; Raman, Ananth. Store Manager Incentive Design and Retail Performance: An Exploratory Investigation. Manufacturing & Service Operations Management; Linthicum vol. 9, Iss. 4, (Fall 2007): 518-534. 2007. (Year: 2007).*

Chou, Yu-Ho. Critical factors of the buyer decision process model in business-to-customer (B2C) e-commerce in Taiwan, 2005, UMI Dissertations Publishing.

* cited by examiner

TELL US ABOUT YOUR NEEDS

How big is your lawn?
< .25 acre    .25 - .50 acre    .50 – 1.0 acre    > 1.0 acre

What type of terrain will you be mowing?
Flat    Flat w/obstacles    Uneven    Uneven w/ obstacles    Hilly    Steep

Why are you purchasing?
Need to replace Old/ not working    Upgrading because I'm moving    Upgrading to innovative product I'm a first time homeowner    Remodeling outdoor project    It's a gift

What will you use your tractor for?
Mowing    Snow Removal    Light Hauling & Maintenance Heavy Hauling & Maintenance    Ground Engaging or Dozer Blade

What type of transmission?
Automatic    Manual Gear    Shift on the go manual Premium, Hydrostatic Automatic    No preference

Do you have a fenced yard with a gate? Yes / No

Do you do your own product maintenance? Yes / No

Have you researched online? Yes / No 602    604

FIGURE 6

BASED ON YOUR SELECTIONS WE RECOMMEND

PRICE RANGE $928.99-$1499.99   SHOWING 1-4 OF 6 RESULTS

6 RESULTS

CRAFTSMAN 17.5 HP 42"
SHIFT-ON-THE-GO LAWN
MODEL # 28883
$1099.99

CRAFTSMAN 17.5 HP 42"
SHIFT-ON-THE-GO LAWN
MODEL # 28881
$999.99

CRAFTSMAN 19.5 HP 42"
AUTOMATIC LAWN
MODEL # 28884
$1199.99

YARD MACHINES 38"
BRIGGS & STRATTON
MODEL # 28604
$929.88

1406 kmart — Can't find what you are looking for?

Electronics | Fitness & Sports | Clothing | Shoes | Bed & Bath | For the Home | Health & Beauty |

Thank You For Your Instore Purchase!

Dear Carol,

Thank you for your recent purchase at Kmart store in Crystal Lake, IL. We hope you had a good experience in our store. We count on our customers' feedback to get better. So if you liked something you saw or something you thought we can improve, you tell us about it. When we say we value your opinion, we really mean it. And we act on it. Click here to give us your feedback.

(2)

For your convenience, here is a digital copy of your receipt. Did you know that you can easily access your receipt from your Sears.com profile. It is not only easily accessible for your records but you could also use it for any exchange or returns. Click here to access your Sears.com account or if you are a member, click here to sign up for ShopYourWay Rewards membership and start taking advantage of this great service and receive great rewards, just for shopping with us.

We thank you for helping us with our efforts to go green by helping us reduce paper consumption. Forward to seeing you at your local Kmart store again.

Again, thanks for your business
Your friends at Kmart

Receipt Information

| | |
|---|---|
| Purchase Date: | 08/05/10 3:00PM |
| Store Location: | Kmart Store 0851<br>3100 W Big Beaver Rd<br>Troy, MI 48084 |
| Store Phone: | (248) 463-1000 |
| Receipt #: | 00851 080510 003 46978 |

1402

1404

Items Purchased

| Items | Qty. | Price |
|---|---|---|
| Samsung 7.1 Channel Blu-ray™ Disc Player<br>Item # 033W748338110001 | 1 | $199.99 |
| Nordic Track T5zi Treadmill<br>Item # 08747884000 | 1 | $649.99 |

| | |
|---|---|
| Initial Subtotal: | $849.98 |
| Additional Savings: | $-20.00 |
| Sales tax: | $86.39 |
| Total: | $736.60 |
| SYW Savings: | 7360 points |
| Payment Type: | Sears Mastercard (Gold and Premier) $736.30 |

Recommendations Items To Go With Your Recent Purchase (1)

Click here to access more personalized recommendations for you at AdYourWay

- 6 ft HDMI Cable $29.99 Shop Now
- Bourne Identity Blu-Ray $30.75 Shop Now
- Universal Remote $67.25 Shop Now
- Apple iPod Nano $149.99 Shop Now
- New Balance Running Shoe $55.90 Shop Now
- Polar heart Rate Monitor $113.99 Shop Now

Returns or Exchanges. It's as easy as 1-2-3 with digital receipts! (3)

To return or return merchandise, please use one of the following options:

1. Access your digital receipt on Sears.com check the items and come by the store for easy returns and exchanges. We will send you an email with a confirmation number. Simply go to the store at <<designated location>>, scan the bar code on the email (digital is fine – no need to print) and pick up the item you want to exchange or simply return the item.
2. Always on the go? No problem. Download our Digital Shopping Assistant iPhone app, log in using your Sears.com profile to access all your receipts and fill out the return/exchange information while you are on the go. Simply stop by to return or pick up item you want to exchange.
3. Print this email and bring it to the store A hint before your print. Think Green!

Be Social (5)

Bought something really cool? Tell your friends about it!

Got questions, need advice? Connect with these users who recently bought these items. Come on in and be part of our Sears Social community

1412

1410

1408

FIGURE 14

SYSTEM AND METHOD FOR USING DATA POINTS COLLECTED FROM A CUSTOMER TO PROVIDE CUSTOMER SPECIFIC OFFERINGS

CROSS-REFERENCE TO RELATED APPLICATIONS/INCORPORATION BY REFERENCE

The present application is a continuation of U.S. patent application Ser. No. 14/060,327, filed Oct. 22, 2013, which is a continuation of U.S. patent application Ser. No. 13/191,918, filed Jul. 27, 2011, now issued U.S. Pat. No. 8,566,167. The above-identified applications are hereby incorporated by reference herein in their entirety.

BACKGROUND

The subject invention generally relates to retail systems and, more particularly, relates to a system and method for collecting data points from a customer and for using the collected data points to provide a customer with customer specific product and/or service offerings, customer relevant information, and the like.

Various systems and methods for collecting data points from a customer and/or for providing customer specific incentives are generally known in the art.

By way of example, U.S. Pat. No. 7,917,386 describes a system and method for distributing, generating, and redeeming incentives, e.g., coupons, rebates, gift certificates or the like, which may be used in conjunction with a rewards card, e.g., a frequent shopper card. The incentives are distributed electronically, for example, in the form of a diskette or CD-ROM software. Once the software is validated, a consumer may print out a list of selected incentives displayed on a Graphical User Interface (GUI). When a product is purchased, the UPC code of the product may be compared electronically with a list of incentives authorized for a particular consumer. An appropriate coupon discount may then be applied and the incentive may be considered "redeemed." Once redeemed, consumer ID information and incentive information may be retrieved electronically and used to update a central database. Accurate data may then be produced illustrating which consumers or groups of consumers are redeeming which incentives.

U.S. Published Application No. 2011/0029368 describes a system for handling electronic coupons which accesses information indicating association of an electronic coupon with an account of a user that identifies multiple retail entities associated with the user. Information indicating association of electronic coupons with the user's account may be transmitted to respective computer systems associated with the multiple retail entities. The computer systems may associate electronic coupons with the user such that the user may redeem the electronic coupons at a retail store upon presentation of a user identifier. When the user redeems an electronic coupon, cancellation information for the electronic coupon may be transmitted to the computer systems of other retail entities associated with the user. Receipt of the cancellation information may cause the respective computer systems to cancel the redeemability of the electronic coupon such that the user is prevented from redeeming the electronic coupon at a retail store associated with the corresponding retail entity.

U.S. Published Application No. 2005/0222906 describes a method for providing at least one targeted local marketing program and for measuring the effectiveness of the at least one targeted local marketing program. The method includes generating at least one targeted message in accordance with instructions of at least one retailer, forwarding the at least one targeted message to a plurality of select customers, and monitoring responses from the plurality of select customers via an identification methodology. The monitoring allows for a determination of the effectiveness of the at least one marketing program, where the targeted messages attract customers to retailers by targeting the plurality of select customers with incentives.

U.S. Pat. No. 6,912,505 describes methods for monitoring user browsing activities that indicate user interests in particular products or other items, and for using such information to identify items that are related to one another. Relationships between products within an online catalog are determined by identifying products that are frequently viewed by users within the same browsing session (e.g., products A and B are related because a significant portion of those who viewed A also viewed B). The resulting item relatedness data is preferably stored in a table that maps items to sets of related items. The table may be used to provide personalized product recommendations to users, and/or to supplement product detail pages with lists of related products. The table is used to provide session-specific product recommendations to users that are based on the products viewed by the user during the current browsing session.

U.S. Pat. No. 7,174,312 describes a user-personalized product sampling, recommendation and purchasing system that uses customer identification numbers and associated customer profile data to tailor specific product recommendations to a customer at a content sampling station of a retail location. The customer also can use her customer profile to receive the same information from an Internet website of the merchant. In-store sampling stations also may have the capability of checking store inventory and central warehouse inventory and providing recommendations to the customer in accordance with product availability, and optionally may provide the customer with the ability to place product orders directly through the sampling station. The recommendation system also can be used to tailor product recommendations in accordance with a rule-based model and real-time inventory data from a point-of-sale (POS) database.

U.S. Published Application No. 2004/0177003 describes a system for distributing adaptive electronic coupons to a user. Electronic coupon metadata automatically changes redemption characteristics of a coupon based upon predetermined conditions relating to personal data of the user and a redemption environment. A redemption system honors the adaptive electronic coupon at a time and place of redemption based on the predetermined conditions relating to the personal data of the user and the redemption environment.

U.S. Pat. Nos. 6,484,146, 7,024,374, and 7,398,348 describe systems for presenting customized special offers to customers, the special offers including targeted offers to a customer selected from a plurality of customers, and for collecting purchasing behavior information concerning the customers which utilize customer cards having machine readable card information indicating at least identification of the card with a particular customer account.

While the systems and method described in these references (which references are incorporated herein by reference in their entirety) generally work for their intended purpose, the invention described hereinafter provides much needed improvements thereto.

SUMMARY

Described hereinafter is a system and method for collecting data points from a customer and for using the collected data points to provide a customer with customer specific product and/or service offerings, customer relevant information, and the like. By way of example, the collected data points may include products viewed by a customer while in a retail establishment, reasons for viewing the products (which are typically indicative of a life event for the customer), etc. The customer specific offerings may include incentives (e.g., discounts, coupons, sweepstake entries, etc.), product recommendations, and the like selected for the customer. The customer relevant information may include information relating to a product purchased by the customer (e.g., product warranties, instruction manuals, etc.) and/or to a life event of the customer (e.g., information relevant to a customer that is moving, doing home improvements, getting married, etc.).

In described embodiments, the subject system resides on a retailer computer system that receives from a first computing device, such as a tablet computing device operated by a sales associate, a shopping recap having data indicative of one or more products that were shown to a customer by the sales associate while the customer was within a retail establishment. The shopping recap may also capture from the customer answers to posed questions relating to life events of the customer, e.g., is the customer moving, replacing a broken product, getting married, etc. The received shopping recap is then stored within a data repository with the shopping recap being linked to a customer identifier that is associated with the customer and an associate identifier that is associated with the sale associate. The shopping recap can also be shared with the customer, for example by email, to entice the customer to purchase the one or more products that were shown to the customer and/or to collect further data points from the customer. If the customer later purchases a product, either on-line or in a store, data indicative of the product being purchased is compared against data within any shopping recap that is linked to that customer to determine if a sales associate that is also linked to any shopping recap of the customer is to be awarded a commission for the product being purchased, e.g., it is determined whether or not the product being purchased is one that was shown to the customer by a sales associate while the customer was within the store or otherwise related to a product that was shown to the customer by a sale associate while the customer was within the store.

The purchase of the product by the customer may further generate a digital receipt where the digital receipt includes a notice that the customer is being awarded an incentive, such as a coupon, entry into a sweepstake, etc. The provided incentives may be in the form of digital incentives where the digital incentives may be linked to a customer loyalty account and, thereby, be automatically redeemable. Meanwhile, the captured life event data may be used to cause the transmission of targeted communications to the customer where the targeted communications are provided to the customer to assist the customer in addressing various issues/mind sets that typically arise during the course of the life event. As will be appreciated, by use of the incentives and life event communications, still further data points may be collected from the customer. These additionally collected data points can then be used to maintain an ongoing dialog with the customer and, thereby, provide the customer with still further relevant product offerings and/or information.

While the forgoing provides a general overview of some of the various features and functionalities of the subject invention, a better understanding of the objects, advantages, features, properties, and relationships of the subject invention will be obtained from the following detailed description and accompanying drawings which set forth illustrative embodiments and which are indicative of the various ways in which the principles of the subject invention may be employed.

BRIEF DESCRIPTION OF THE DRAWINGS

For a better understanding of the subject invention, reference may be had to preferred embodiments shown in the attached drawings in which:

FIG. 2 illustrates a flow chart diagram of exemplary steps used to collect data points from a customer and for using the collected data points to provide customer specific incentives, customer specific information, sales associate commissions, and/or the like;

FIGS. 3-14 illustrate exemplary screen shots of a "shopping recap" application running on a tablet computing device as used to collect data points from a customer.

DETAILED DESCRIPTION

With reference to the figures, the following describes a system and method for collecting data points from a customer, for using the collected data points to provide customer specific offerings, incentives, information, and the like, and for rewarding sales associates based upon their involvement in the process.

Figure 1:
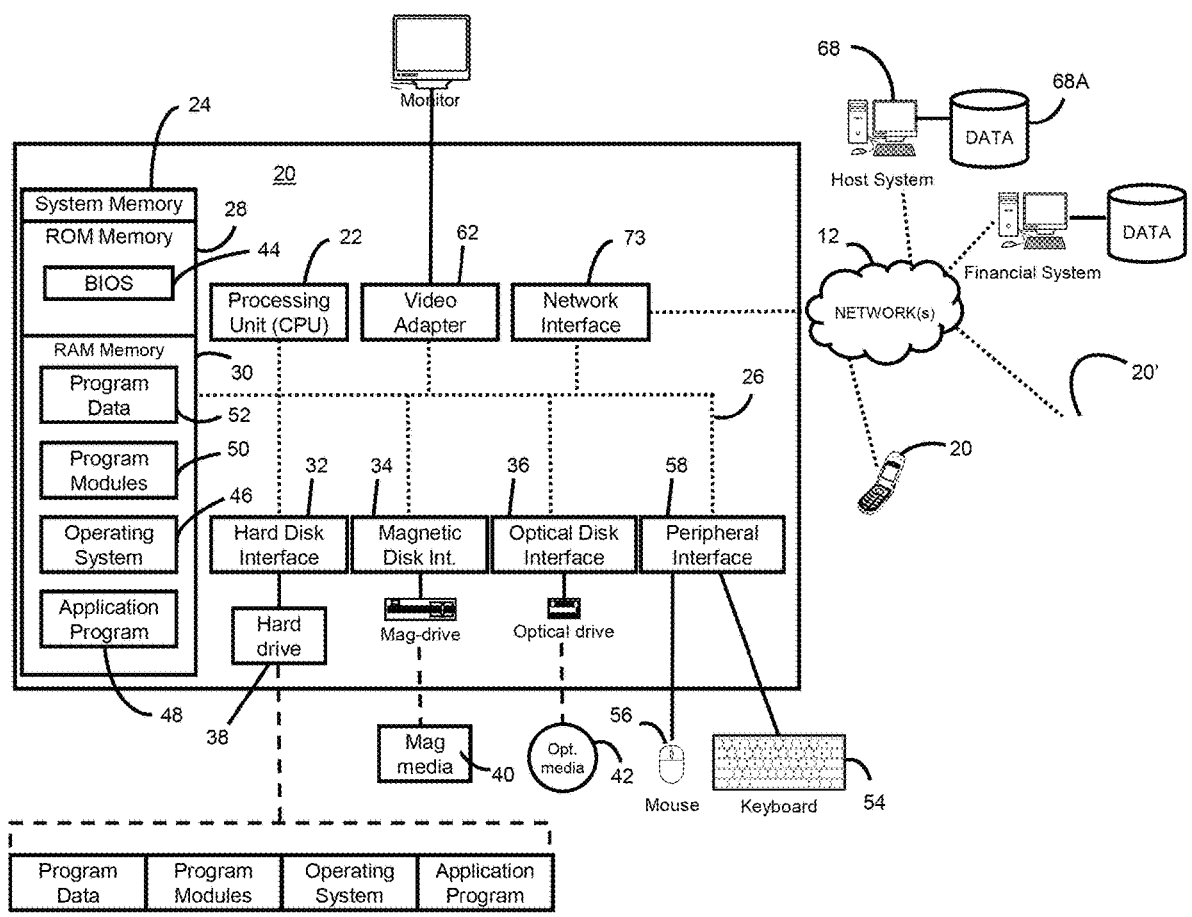
FIG. 1 illustrates in block diagram form components of an exemplary system for collecting data points from a customer and for using the same.

Turning to FIG. 1, illustrated is an exemplary system for collecting data points from a customer and for using the collected data points to provide enhanced retail services in a manner that is described in greater detail hereinafter. As illustrated, the exemplary system includes a processing device 20 whereby a customer may register with and/or otherwise access an online retail channel hosted by a retailer system 68 associated with one or more retail establishments to, among other things, view and purchase product being offered for sale by the retail establishment(s). As will be appreciated, during the registration process the customer may establish a log-in name/password combination for providing secure and recognized access to the retailer system 68 (which information and/or cookies provided to the processing device 20 will additionally allow the retailer system 68 to track data points associated with the online usage of the retailer system 68 by the customer—such a pages viewed, products purchased, etc.), provide a contact email address, phone number, or other unique identifier, provide demographic information such as age, gender, preferences, interests, etc. As a result of the registration process (which may also be done by the customer while within the retail establishment), the customer will additionally be associated with a unique customer ID, which customer ID may, but need not, be reflected on a physical and/or digital rewards card that will be provided to the customer. For example, the customer ID may be reflected in a device having a machine readable code, such as a barcode imprinted on a physical rewards card or be otherwise displayable/transmittable via use of a device such as a smart phone. Using the same or another processing device, the customer may additionally receive from the retailer system 68 digital incentives or other communications that will be associated with their customer ID. While illustrated in the exemplary form of a personal computer, it is to be understood that the processing device 20 may be embodied in any type of device having the ability to execute instructions such as, by way of example only, a personal-digital assistant ("PDA"), a smart phone, a tablet computing device, or the like. Furthermore, while described and illustrated in the context of a single processing device 20, those skilled in the art will also appreciate that the various tasks described herein may be practiced in a distributed environment having multiple processing devices linked via a local or wide-area network, such as the Internet, whereby the executable instructions may be associated with and/or executed by one or more of the multiple processing devices.

More particularly, to provide a means for a purchaser to access the online channel of the retailer(s) (and to perform various tasks as necessary) the processing device 20 preferably includes a processing unit 22 and a system memory 24 which may be linked via a bus 26. Without limitation, the bus 26 may be a memory bus, a peripheral bus, and/or a local bus using any of a variety of known bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated physically embodied, i.e., non-transitory, computer-readable media allow for the storage of instructions, data structures, program modules, and the like for execution by the processing unit 22 of the processing device 20. Those skilled in the art will further appreciate that other types of physically embodied computer-readable media that can store data and/or executable instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories. Meanwhile, the program modules that may be stored in one or more of the memory/media devices may include a basic input/output system (BIOS) 44 which contains the basic routines that help to transfer information between elements within the processing device 20, such as during start-up, an operating system 46, one or more applications programs 48 (such as a Web browser), other program modules 50, and/or program data 52.

To allow a customer to enter commands and information into the processing device 20, e.g., to create or upload task related instructions, to search for and purchase product, indicate how an order for product is to be fulfilled, etc., input devices such as a touch pad or keyboard 54 and/or a pointing device 56 are provided. While not illustrated, other input devices may include a microphone, a joystick, a game pad, a scanner, a camera, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as speakers and printers.

As noted above, the processing device 20 may also utilize logical connections to one or more remote processing devices, such as a retailer system 68 having associated data repository 68A. As will be understood, the data repository 68A may maintain a database of product that is being sold by the retailer(s), customer related information (including information concerning past purchasing histories of particular customers, product viewing histories of particular customers, demographic information for particular customers, incentives available for and/or being offered to particular customers, etc.), financial information, and the like type of data used in commerce. While the retailer system 68 has been illustrated in the exemplary form of a server computer, it will be appreciated that the retailer system 68 may, like processing device 20, be any type of device having processing capabilities. Similarly, it will be appreciated that the retailer system 68 need not be implemented as a single device but may be implemented in a manner such that the tasks performed by the retailer system 68 are distributed amongst a plurality of processing devices/databases located at the same or different geographical locations and linked through a communication network. Additionally, the retailer system 68 may have logical connections to other third party systems 80 via the network 12 and, via such connections, will be associated with functions that are supported by and data repositories that are linked to such other third party systems. Such third party systems may include, without limitation, systems of banking, credit, or other financial institutions, systems of third party providers of product, systems of shipping/delivery companies, systems that support social networking, etc.

For performing tasks as needed, the retailer system 68 may include many or all of the elements described above relative to the processing device 20. In addition, the retailer system 68 would generally include executable instructions that are likewise stored on physically embodied memory devices for, among other things, supporting online retail channel services, supporting physical retail channel services, i.e., in store, maintaining records, etc. The retailer system 68 may thus include links to point-of-sale (POS) devices, e.g., cash registers, that are located within one or more retail stores without limitation. As will also be described in greater detail hereinafter, the retailer system 68 further has instructions for storing and using captured information related to products that a customer is viewing while in a retail establishment (e.g., as captured by a sales associate using a processing device 20') to, among other things, provide customer specific incentives. To this end, the system may incorporate a recommendation or selection engine which utilizes techniques to discern relationships in a manner similar to the engines described in the references listed in the background section of this document.

Communications between the processing devices 20/20' and the retailer system 68 may be exchanged via a further processing device, such as a network router, that is responsible for network routing. Communications with the network router may be performed via a network interface component 73. Thus, within such a networked environment, e.g., the Internet, World Wide Web, LAN, or other like type of wired or wireless network, it will be appreciated that program modules depicted relative to the processing devices 20/20', or portions thereof, may be stored in the memory storage device(s) associated with the retailer system 68.

As noted above, the retailer system 68 includes instructions for storing and using data points collected from a customer to, among other things, provide customer specific offerings and/or informational services. The collected data points may be reflective of a specific customer's online experiences with the retailer system 68 as well as the specific customer's in-store experiences with one or more retail establishment(s), i.e., the captured data points are preferably reflective of the multi-channel experiences for a specific customer. The data points reflective of the customer's online experiences may include products viewed while online, products purchased while online, products placed into one or more lists (e.g., a wish list, shopping cart list, etc.), product information captured by the customer (e.g., via use of a mobile barcode scanning application), expressed or inferred interests of the customer, expressed or inferred communities for that customer (e.g., as indicated by online social network links), etc. Demographic data points for the customer (e.g., residence address, gender, age, marital status, etc.) may also be captured via the online channel or may be provided by the customer while within a retail establishment. Data points captured via the in-store retail channel may similarly include data points reflective of products viewed while the customer is within a store, products purchased within a store, etc. The data points collected online or in-store, e.g., via an ongoing dialog with the customer, may also be indicative of one or more life events of the customer, e.g., the customer is moving, replacing product, getting married, etc. As discussed above, such data points captured for a specific customer would be associated with a customer ID, e.g., phone number, email address, a physical or digital rewards card having an associated machine readable indicia, or the like.

Figure 2:
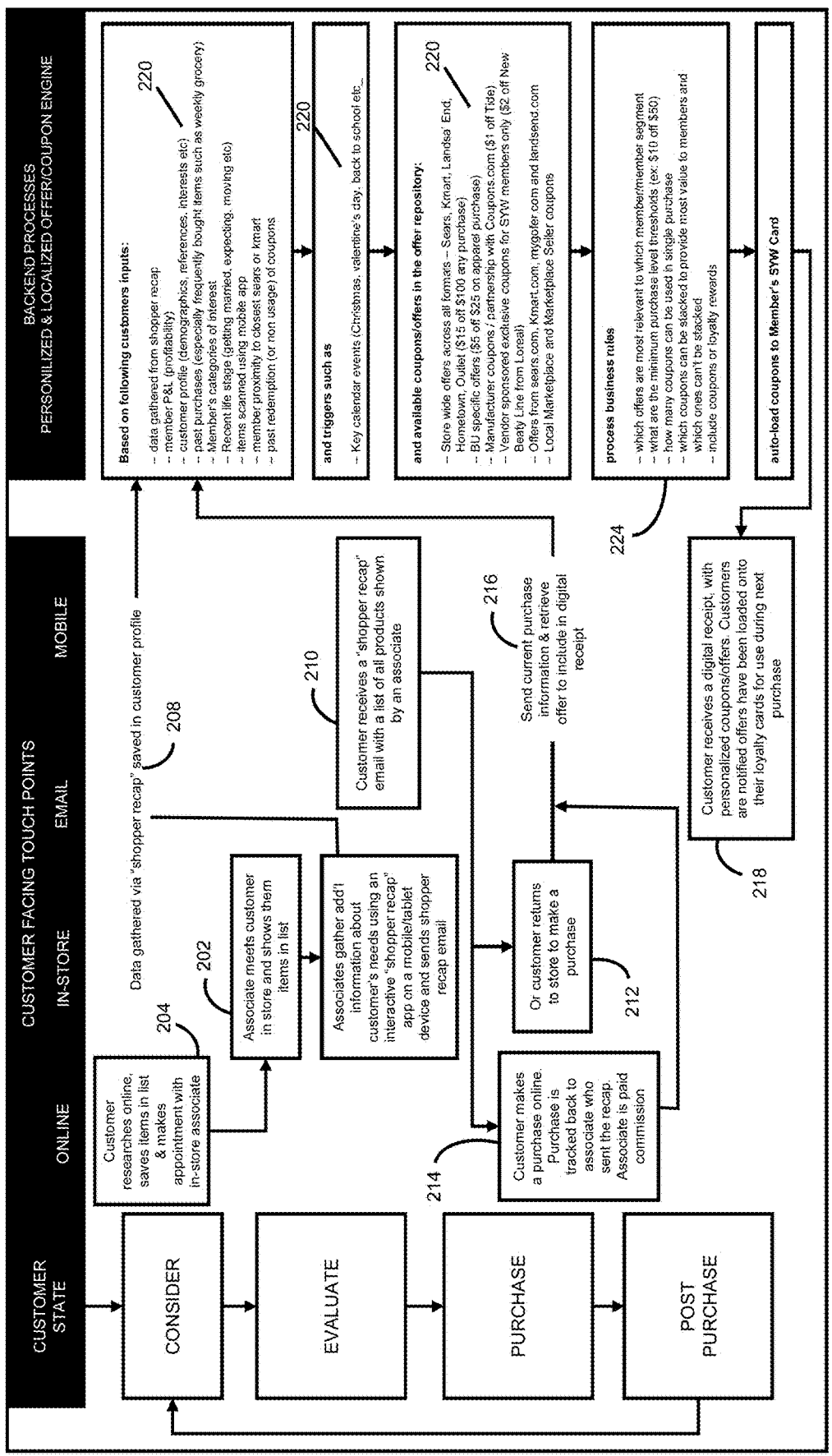

For collecting data points from a specific customer while that customer is within a retail establishment, it is contemplated that a "shopping recap" procedure may be utilized as generally illustrated in FIG. 2. By way of non-limiting example, the "shopping recap" procedure may be initiated by a customer meeting 202 with a sales associate in the retail establishment whereupon the sales associate will show the customer one or more products that may be of interest to the customer. While not required, the products to be shown to the customer by the sales associate may be pre-designated by the customer before their arrival to the retail establishment, for example by being specified in an online generated list 204. In connection with the generation of the online list, an appointment may be made to meet the sales associate at a given time at a given store location. As will be appreciated, any list generated in this manner is preferably routed to a sales associate, for example to their processing device 20', prior to the scheduled appointment to thereby allow the sales associate to gather or otherwise locate within the retail establishment the product(s) of interest. When a list is generated online in this manner, any data points captured during the online session that was used to generate the list, e.g., products viewed, added to the list, etc., may also be associated with that particular customer for later reference and use by the system. Data points regarding online activities may be captured and associated with the customer via use of their log-in information, provided customer ID, a stored cookie, or the like. In the event that such data points are not captured during the online list generation process, e.g., the customer did not register with the retailer system 68 when creating the list, the customer did not create a list prior to entering the store, etc., data points with respect to the products viewed by the customer may nevertheless by captured by the sales associate during the product review with the customer, e.g., the sales associate may register the customer with the system as part of the product review process and enter data points 206 indicative of products being shown to the customer, demographic information, etc. into their processing device 20' as needed for uploading 208 to the retailer system 68. Such in-store, captured data points will be saved into a customer's profile that is linked to the customer ID whereupon it will be available for use by the engine that is provided to determine offers/coupons and the like for customers. In the event that a customer decided to purchase any of the items that are shown to the customer during this meeting, the purchase of such items would also be captured by the system, e.g., at the POS, and the data points related to such purchase(s) would be similarly saved into the customer's profile. If the customer is not ready to make a purchase and wants to think about it, the sales associate can then interact with the system to cause a detailed "shopping recap" to be send to the customer. The "shopping recap" may be in the form of an email that lists all the items the sales associate showed to the customers as well as associate's personal notes on each item. Alternatively or in addition to sending an email, the "shopping recap" may be made available to the customer via online access to the retailer system 68 or via an "app" provided to the customer for use on their smart phone.

Through use of the "shopping recap" provided to the customer 210, the customer can return to a store associated with the retailer to complete their purchase 212 and/or the customer may interact with the "shopping recap" to go online and review all the items they were shown in the store and also see the associate's notes on each item. The "shopping recap" may additionally provide links whereby the consumer can add product(s) to their shopping cart and complete their purchase online 214 in an otherwise conventional manner. As will be appreciated, data points associated with a purchase of a product, whether online or in-store, and/or data points associated with the customer viewing product online is again preferably captured and uploaded 216 to the system server 68 for inclusion in the customer's profile.

By way of more specific example, reference is made to FIGS. 3-14 which illustrate a method by which a sales associate captures data points for a customer via use of a table computing device. It will be appreciated that a smart phone or the like could also be used by a sales associate in the same or similar manner to achieve the same end. As such, the illustrated example is not intended to be limiting.

Figure 3:
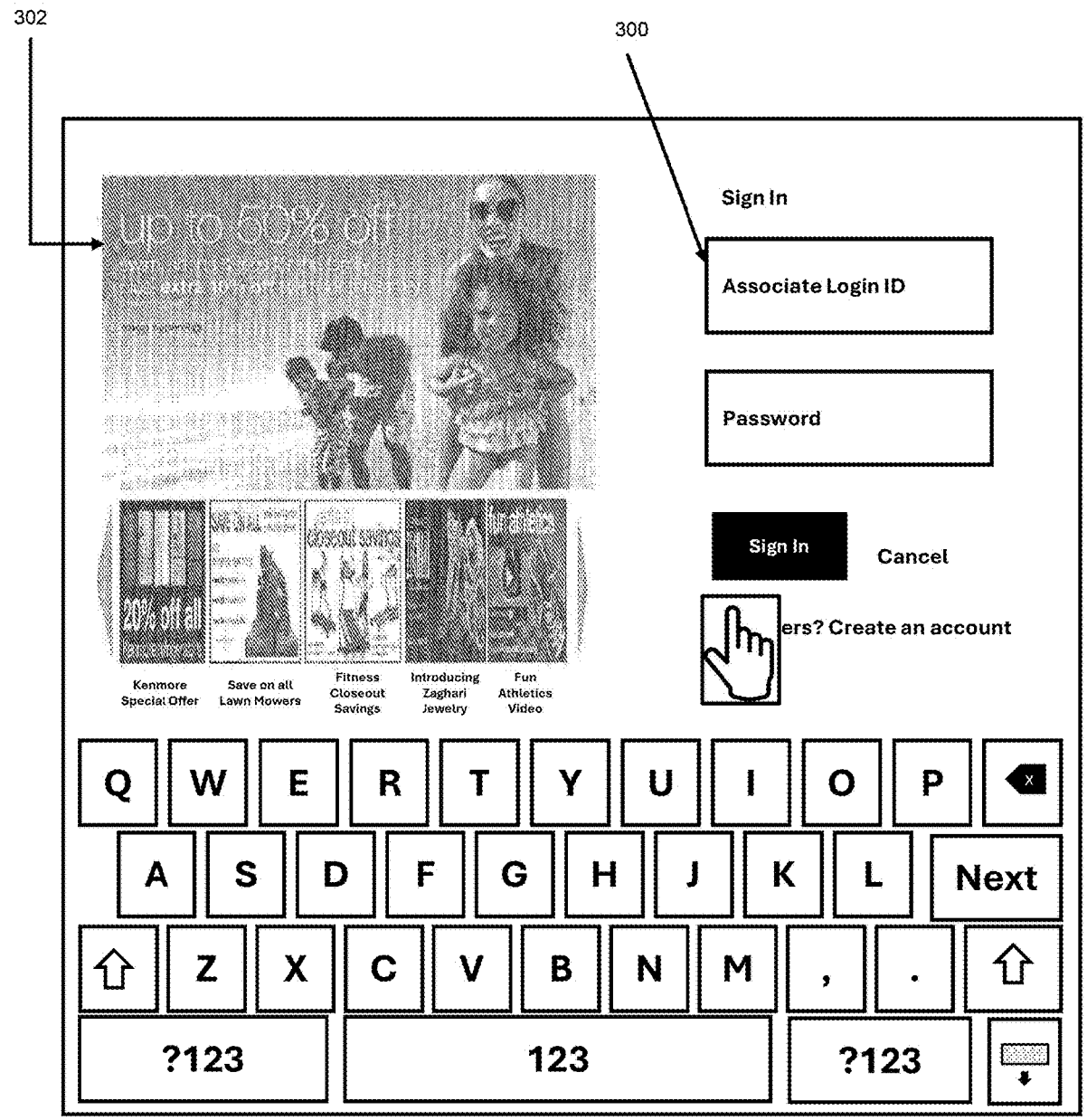

As shown in FIG. 3, when a customer meets with the sales associate, the sales associate opens up an "assisted selling tool" app on their device 20' and provides their log-in information 300. The log-in information provided will be used to link the sales associate with the to-be-created shopping recap for the various reasons described hereinafter. At this time, the "assisted selling tool" app may additionally present, for viewing by the customer and/or the sales associate, messaging in a window 302. This messaging may display advertisements and/or video messages for various business units and/or vendors within the retailer network to advertise key messages, offerings, and the like. For example, a slideshow of messages can be displayed and advertisements can be selected by clicking on presented links. It is contemplated that the advertisements can be dynamic and updated in real-time as needed to convey desired information. The advertisements can also be specific to key shopping time frames (e.g., Christmas) or used to communicate new arrivals, special offers, weather related messages, or even price changes in response to competition at the local level. Still further, it is contemplated that various entities within the retailer network can bid to advertise in this space. Clicking on a presented advertisement may further function to take the device to a specific page of product listings, e.g., appliances, clothing, or the like.

Figure 4:
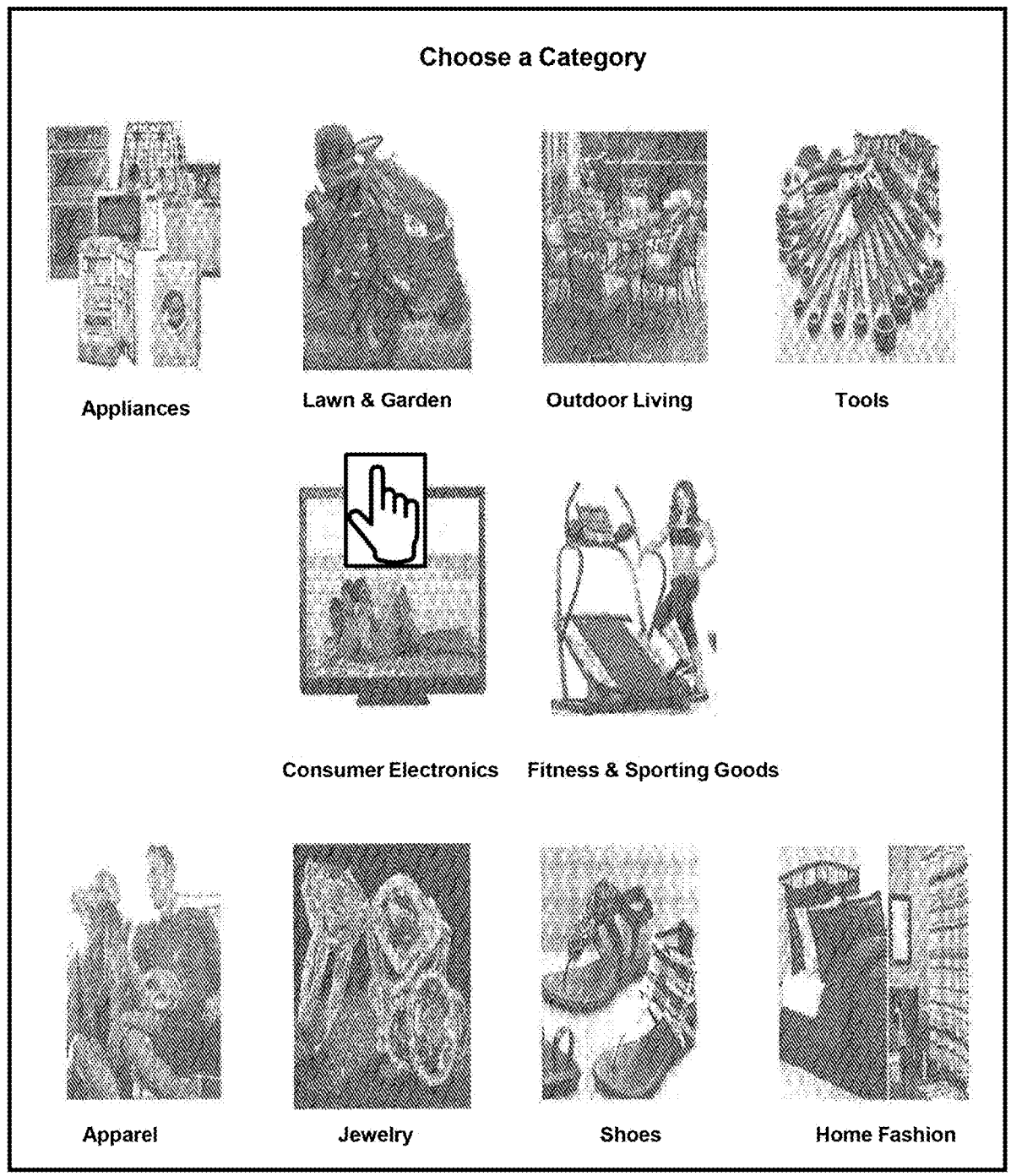
Figure 5:
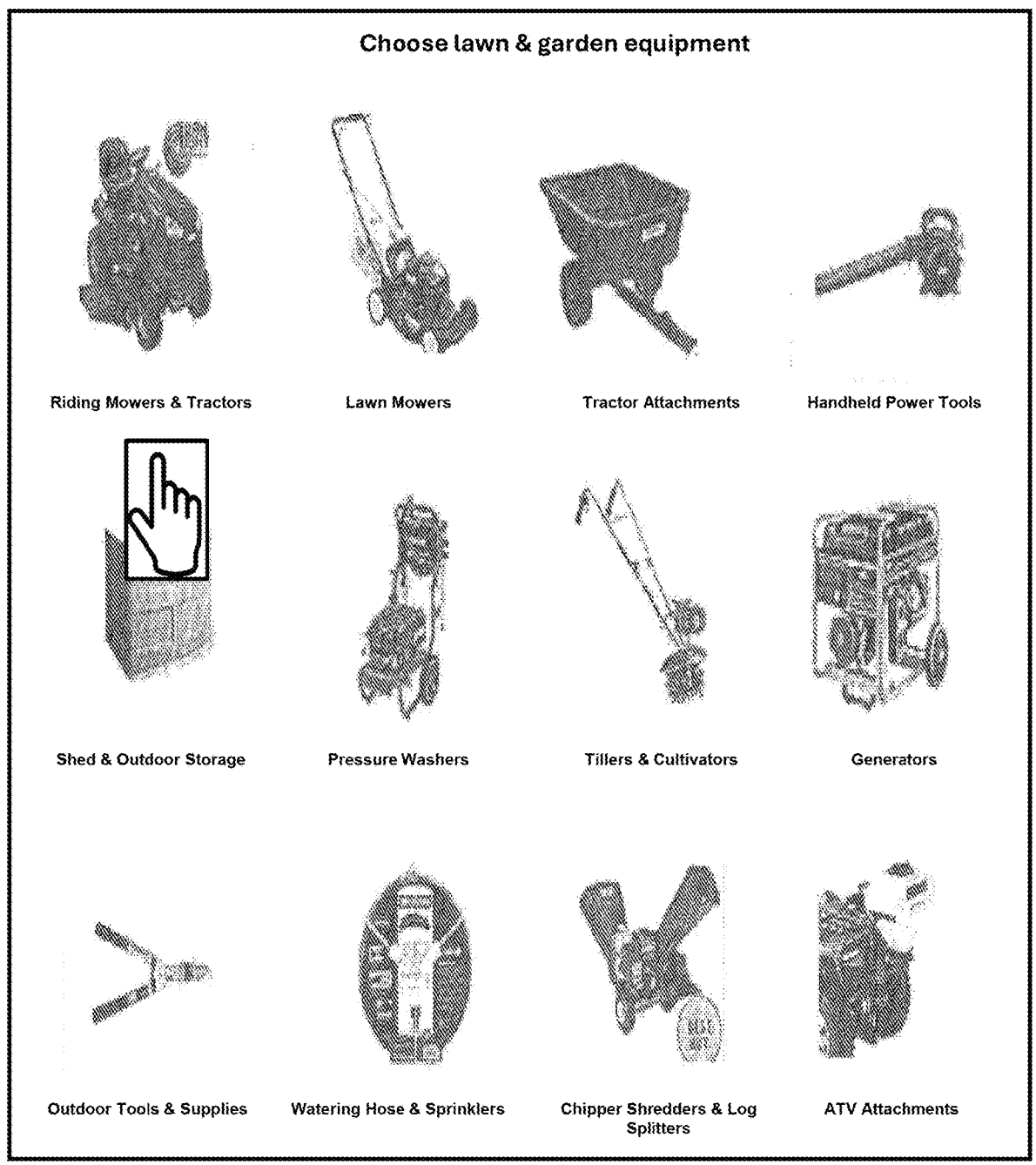
Figure 8:
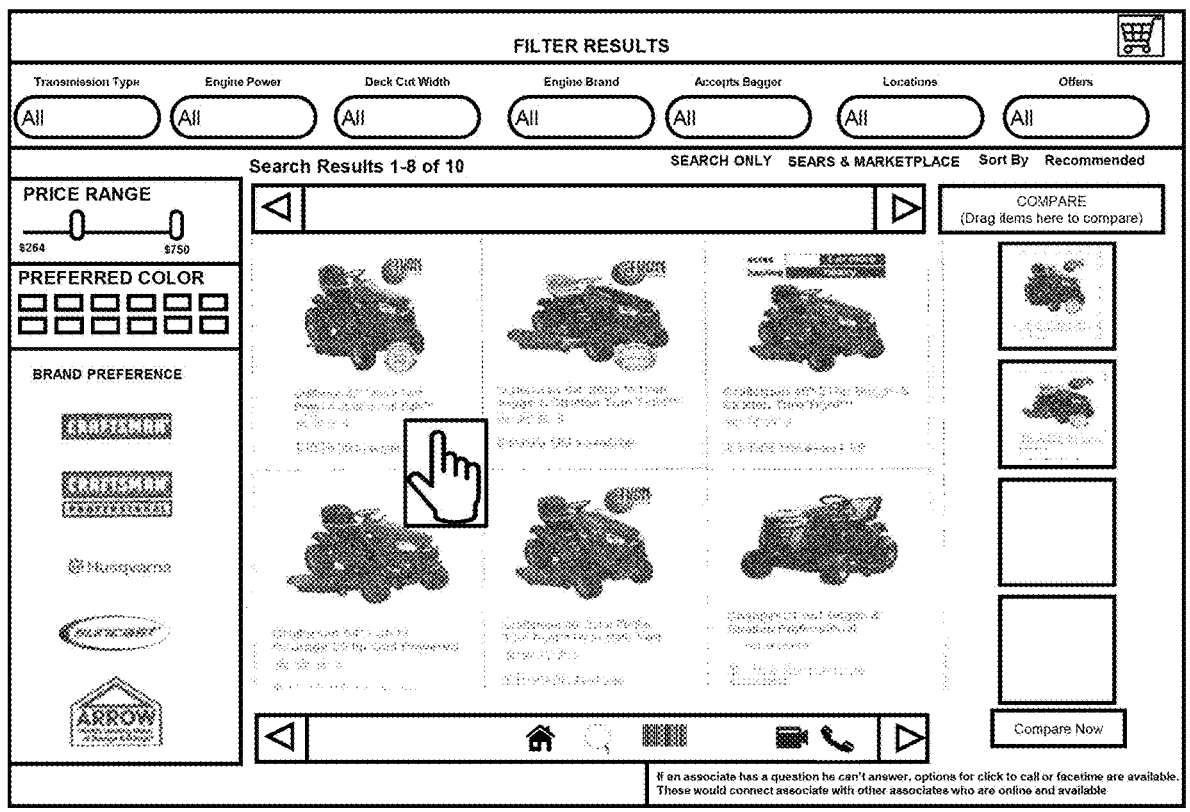
Figure 9:
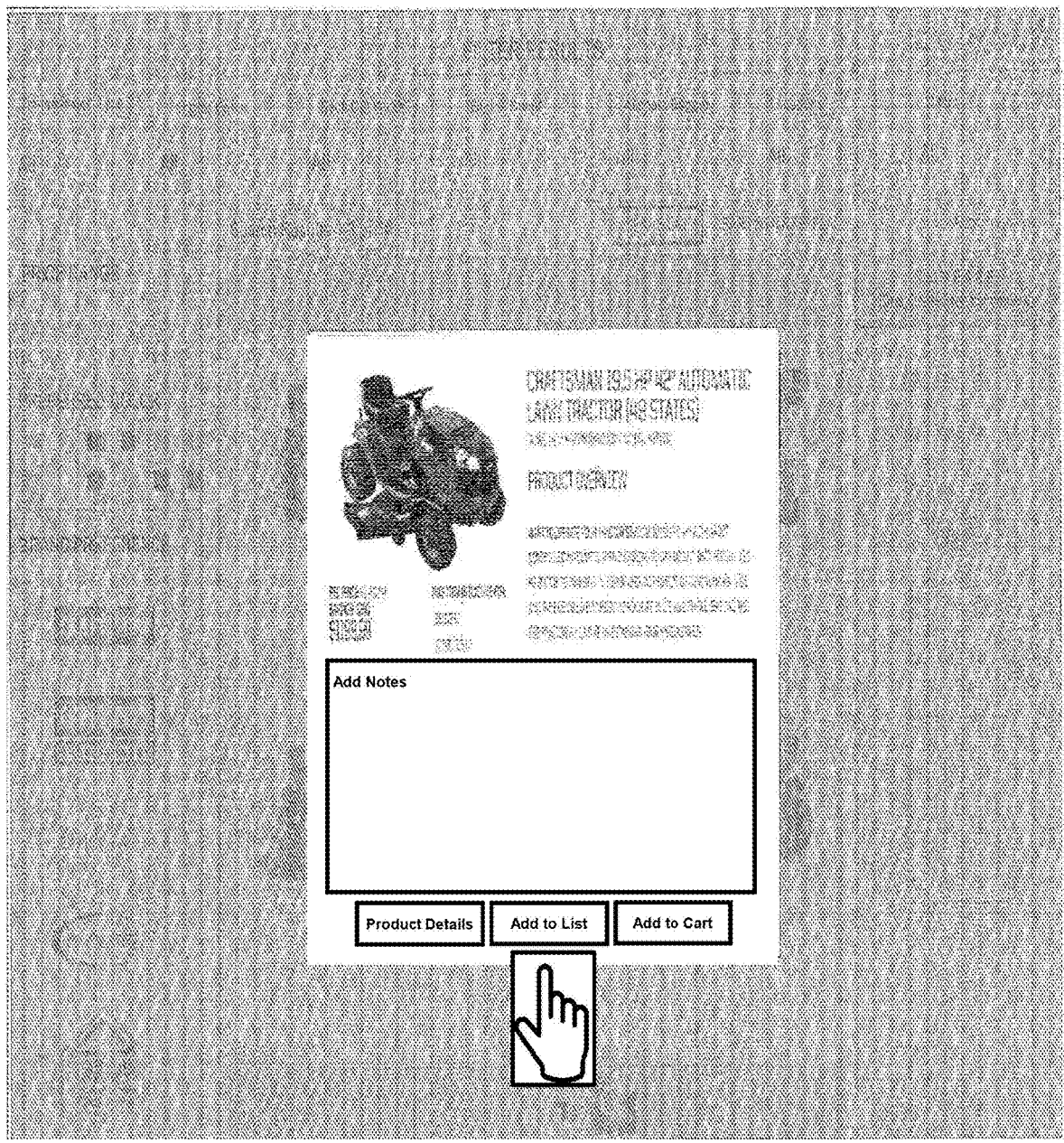

After the sales associate has logged into the system, the sales associate may then start collecting data points that are reflective of the interests of the customer. In this illustrated example, the sales associate interacts with the device 20' to indicate a category of product (e.g., "lawn and garden" as shown in FIG. 4) and a specific type of product within that category (e.g., "riding mowers and tractors" as shown FIG. 5) that the customer has expressed an interested in viewing. In addition, the sales associate will collect data points reflective of the needs of the customer as shown in FIG. 6. For example, the system can seek responses from the customer to various questions to obtain information indicative of intended uses and needs for the product of interest as well as information indicative of customer life events. The information indicative of intended uses and needs for the product of interest will be used by the system to narrow down product choices for the customer while the information indicative of life events (e.g., why is the customer interested in purchasing the product) will be used by the system to establish an on going dialog with the customer as described in greater detail hereinafter. As will be appreciated, the questions posed to the customer in this stage of the process may be varied as needed depending upon, for example, the category of product that is of interest to the customer. As answers to the posed questions are provided, with the answers preferably being highlighted for ease of confirmation purposes (e.g., by a black boundary 602), the system may continually update, in real time, the number of products 604 that meet the currently obtained selection criteria. Clicking on the "results" indicator may then take the sales associate to a listing of the products as shown in FIG. 7. In addition, or alternatively, with the listing of products, the system may ask that the sales associate obtain still further information from the customer to assist in narrowing down the customer's choices as shown in FIG. 8. In any event, when the choices have been narrowed to the satisfaction of the customer, the sales associate may then walk the customer around the store to show the customer product at which time the sales associate may add any of the product located via use of the computing device 20' (as well as any notations related thereto) to the "shopping recap" product listing as shown, for example, in FIG. 9. It will also be appreciated that additional product shown to the customer during this in-store showing may also be added to the "shopping recap" product listing, for example, by simply scanning the barcode of such product using the computing device 20'.

Figure 10:
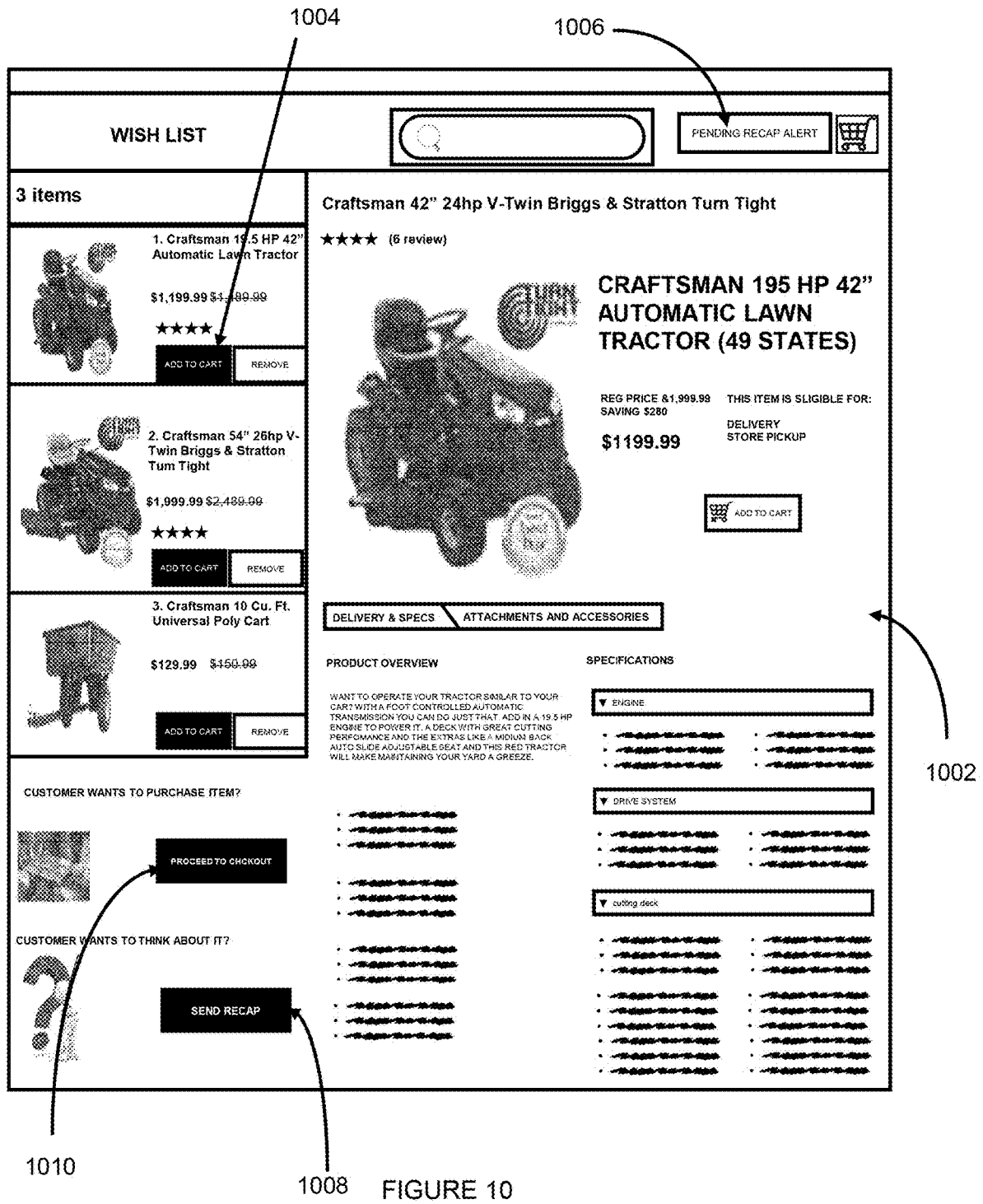
Figure 11:
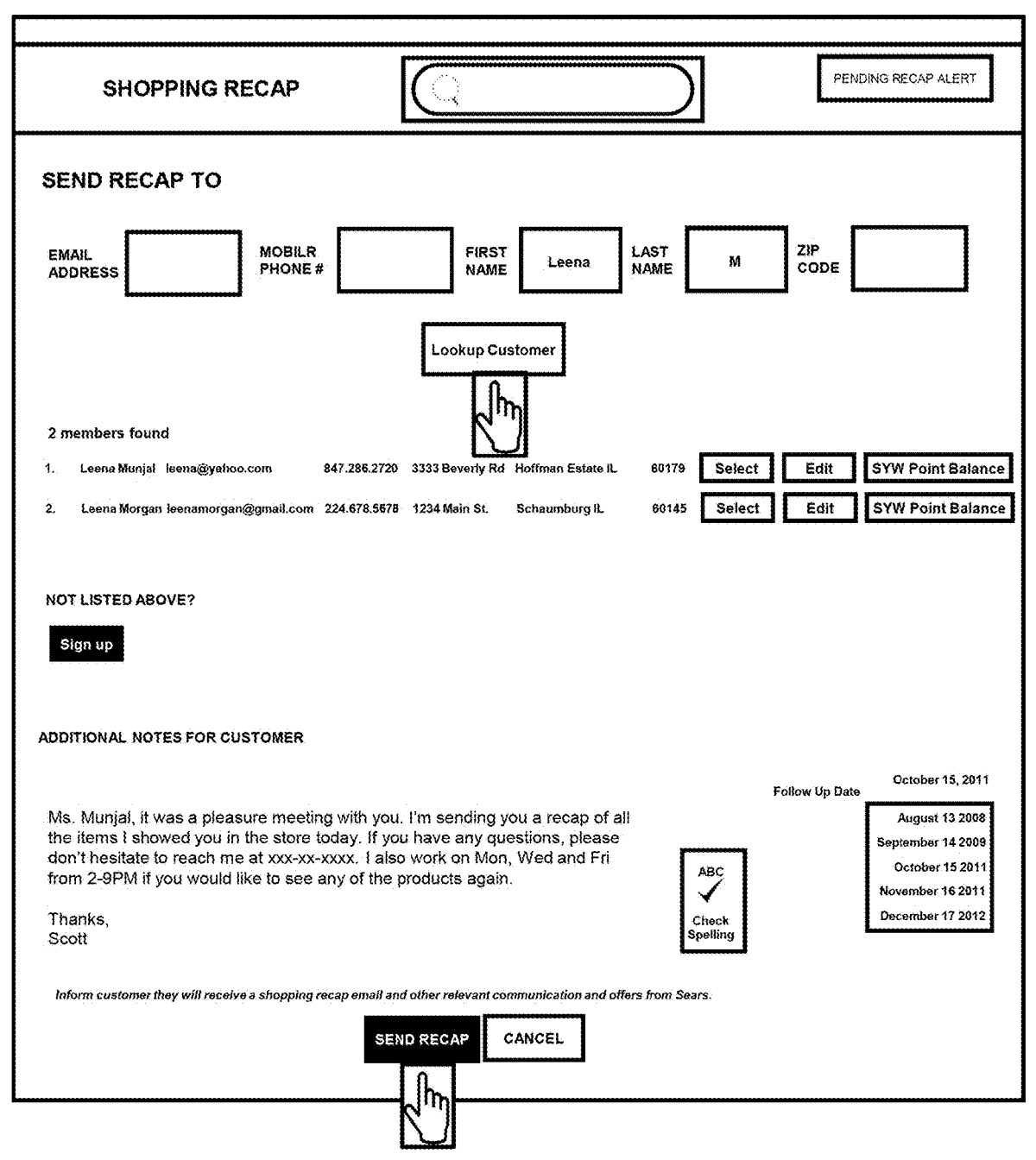
Figure 12:

When the sales associate and the customer have finished the in-store review process, the sales associate may then bring up the listing of product that was indicated by the customer to be of interest as shown in FIG. 10. From this page, detailed information 1002 related to any of the product can be viewed, product can be added to a shopping cart associated with the customer (e.g., for immediate purchase or purchase via the on-line channel) or removed from the listing 1004, a notification can be presented to the sales associate 1006 that a "shopping recap" alert is pending (which "shopping recap" can be sent to the customer via activation of link 1008), and/or the sales associate may interact with the device 20' to proceed with the purchase of any product 1010. In the event that a "shopping recap" is to be sent to the customer, the sales associate will proceed to initiate a customer look-up (or otherwise register the customer with the system) as shown in FIG. 11 at which time the "shopping recap" will be linked to a customer identifier, such as their frequent shopper account. Before sending the "shopping recap" to the customer, the sales associate may also provide any additional notes that might be appropriate for the customer and/or indicate any reminder "follow-up" dates as further illustrated. In the event that a customer indicates a desire to purchase any of the product, e.g., product added to the shopping cart, the system may determine if the product is available at the current retailer location and/or via on-line purchase and, if so, the customer information is gathered (similar to the manner described above whereby the "shopping recap" and purchasing data points are linked to the customer identifier) and any payment, delivery, etc. information is capture either via use of the device 20' or at a POS device as shown in FIGS. 12 and 13.

Figure 13:
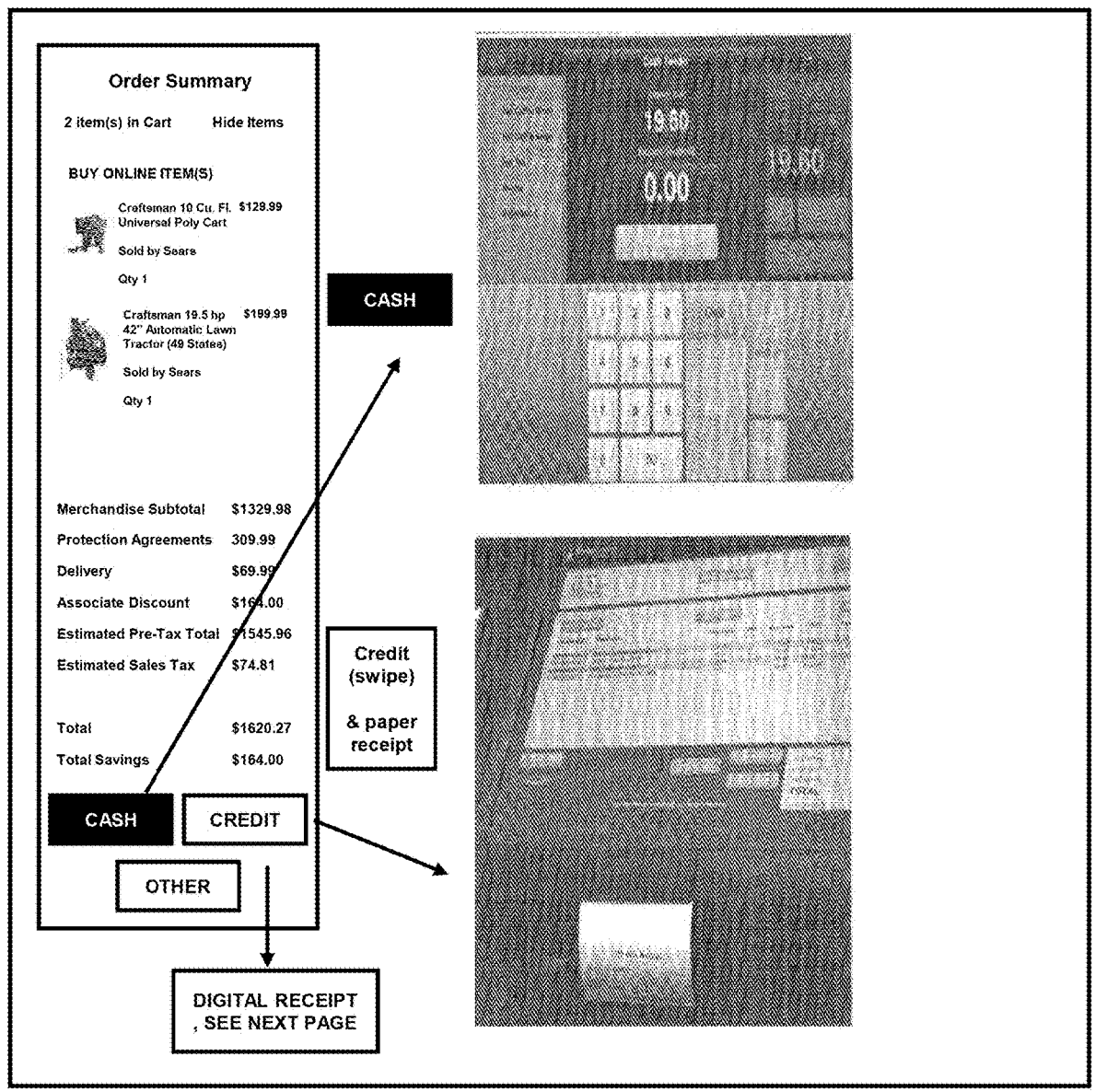

In connection with a purchase of a product, the customer may be issued a print receipt and/or a digital receipt as further illustrated in FIG. 13. Any product related references, such as user manuals, how to videos, or the like, can also be provided digitally to the customer with the purchase of a product. More particularly, the digital receipt, an example of which is illustrated in FIG. 14, may include a recap of the purchase 1402, an ad circular 1404 with recommendations for (and links to purchase) additional product related to the purchase, related to calendar dates (e.g., Christmas, Valentine's Day, etc.), and/or related to a life event of the customer (e.g., moving boxes), a means 1406 for a customer to provide feedback with respect to the process, information 1408 for returning/exchanging the process, links 1410 to product detail information, user's manuals, how-to videos, warranty information, protections agreements, etc., and links 1412 to social networks (e.g., to share the purchase with a friend).

When a customer ultimately purchases a product that was shown to the customer by a sales associate as described above, the purchase is preferably tracked back to the "shopping recap" and the associate that sent the "shopping recap" is provided with a paid commission. To this end, the "shopping recap" is preferably also linked to a sales associate ID whereby, when a given customer purchases an item, e.g., a product is scanned at the POS or purchased online by a known customer, the system will determine if the product is linked to a particular "shopping recap" for that customer and, if so, will determine from the sales associate ID also linked to that "shopping recap" which sales associate is to be paid the commission.

In certain circumstances it is contemplated that a "shopping recap" might not lead to a purchase of a product that was actually shown to a customer by a sales associate but might instead lead to a purchase of a related product, e.g., a product that is displayed as a recommendation in the "shopping recap" email and/or on a webpage that displays a product shown to the customer during their visit to the retail establishment, etc. In the event that a customer purchases such a related product, a partial commission may be paid to the sales associate. By way of non-limiting example, a sales associate may show a customer lawn mowers 1, 2, and 3 during their visit but the customer ultimately purchases lawn mower 4. If the customer was exposed to lawn mower 4 as a result of lawn mower 4 being related to any of lawn mowers 1, 2, or 3, e.g., the customer saw lawn mower 4 as a recommendation presented in a carousel displayed in the "shopping recap" email, in a product detail page for any of items 1, 2, or 3, etc., which recommendations may appear under the heading "people who viewed product X bought product Y," the sales associate will be paid a partial commission or spiff since the customer didn't buy the exact same product the sale associate presented but did buy something in same "line" or same "division" as the product(s) the customer was shown. While described in the context of "people who viewed X, also purchased Y," it will be appreciated that related products may also be presented as listing of known accessories for a product shown to a customer, e.g., presented under a heading "attachments to go with this product," or the like. To provide sales commissions in this manner, it will be appreciated that the database will additionally maintain links between the sales associate ID, the "shopping recap," and products known to be related to the products within the "shopping recap."

Yet further, it is contemplated that a commission may be provided to the sales associate that performed the initial product review with the customer in the event that the customer returns to the store and a different sales associate finalizes the purchase of a product previously shown to the customer. For example, a circumstance may arise where sales associate 1 sends the "shopping recap" email with the list of products shown to the customer yet, when the customer returns to the store (or goes to a different store within the retail network), sales associate 1 is not working and sales associate 2 meets with the customer and asks who they worked with previously. Because sales associate 1 is not in the store, sales associate 2 pulls up the "lead" or "shopping recap" and helps the customer make a purchase. In such a case, a partial commission or spiff may still be provided to sales associate 1 (since they entered the recap) while a full commission may be provided to sales associate 2 (who made the sale).

As described previously, when the customer makes a purchase of a product, the customer will be provided 218 with a digital receipt of the purchase, e.g., in an email, via the "shopping recap" app, or the like. The digital receipt will additionally include a described incentive, e.g., a coupon which is available for immediate use, that is selected particularly for that customer, i.e., a personalized incentive. For example, a message may be provided with the digital receipt which states: "Thank you for being a valued rewards member. To make sure you get the most out of your benefits, we have auto-loaded the following coupon(s) to your rewards account. All you have to do is go the store and give your account number, email, or mobile number at the time of checkout—and see all the coupons applied to your purchase." Because the incentive will be automatically linked to the customer, when a product or products associated with the provided incentive is purchased by the customer (whether online or at the POS), the SKU or UPC code of the product or products being purchased will be compared against a list of incentives authorized for that particular consumer and an appropriate discount or reward—if applicable—will then be automatically applied to the purchase. At this time, the incentive may be considered "redeemed" and, once redeemed, the customer's information and incentive information is used to update the database. In this manner, multiple redemptions of an incentive is avoided while accurate data is produced for customers illustrating which customers or groups of customers are redeeming which incentives.

To provide personalized incentives, the system utilizes an engine that determines which offers/coupons should be provided to a given customer given certain information about that customer as noted above. More particularly, the information that is preferably provided to the engine includes, but need not be limited to, one or more of: information gathered for the customer during their "shopping recap" experience; profitability of the customer; demographics, preferences, and interests for the customer; past purchasing history for the customer; browsing/viewing behaviors of the customer, previous spending and shopping frequency history for the customer; life stages for the customer; items scanned by the customer via use of a mobile app; proximity of the customer to a store within the retail network; and past incentive redemption history of the customer. The engine considers such information 220 against a database of available coupons/offers 222, using appropriate business rules 224 (e.g., by providing weights to the various data points collected and weights to the various coupons/offers), to select which offers are most relevant to a given customer, i.e., to select which offers should be provided to a given customer. In addition, the business rules used to select which offers to provide to a given customer may additionally consider data points such as minimum purchasing thresholds applicable to a given incentive, the number of incentives that can be redeemed in a single purchase, which incentives can be stacked, and/or whether loyalty rewards would be more effective for the customer than providing a discount coupon as an incentive. By way of example, a loyalty reward may be a reward wherein X number of points are earned for every $1.00 spent (which points may be multiplied for one or more tiers of bonus members) whereupon, when shopping in a store or online, a customer need only scan their loyalty card, provide a PIN, their phone number, email address, or the like as appropriate—all of which are "customer IDs"- to receive a discount worth $1.00 in value for every Y number of points the customer elects to redeem. Personalized incentives may further be provided to customers based on additional triggers 226, such as calendar dates or the like.

It is further contemplated that the ability to receive such personalized awards may also be limited to select customers, e.g., customers having a history of high spending (e.g., have a previous purchasing history over a given dollar amount) and/or are high margin shoppers and/or are high frequency shoppers and/or have a history of using coupons. Thus, members meeting any such criteria may be provided with an invite to join the subject rewards program.

Figure 15:
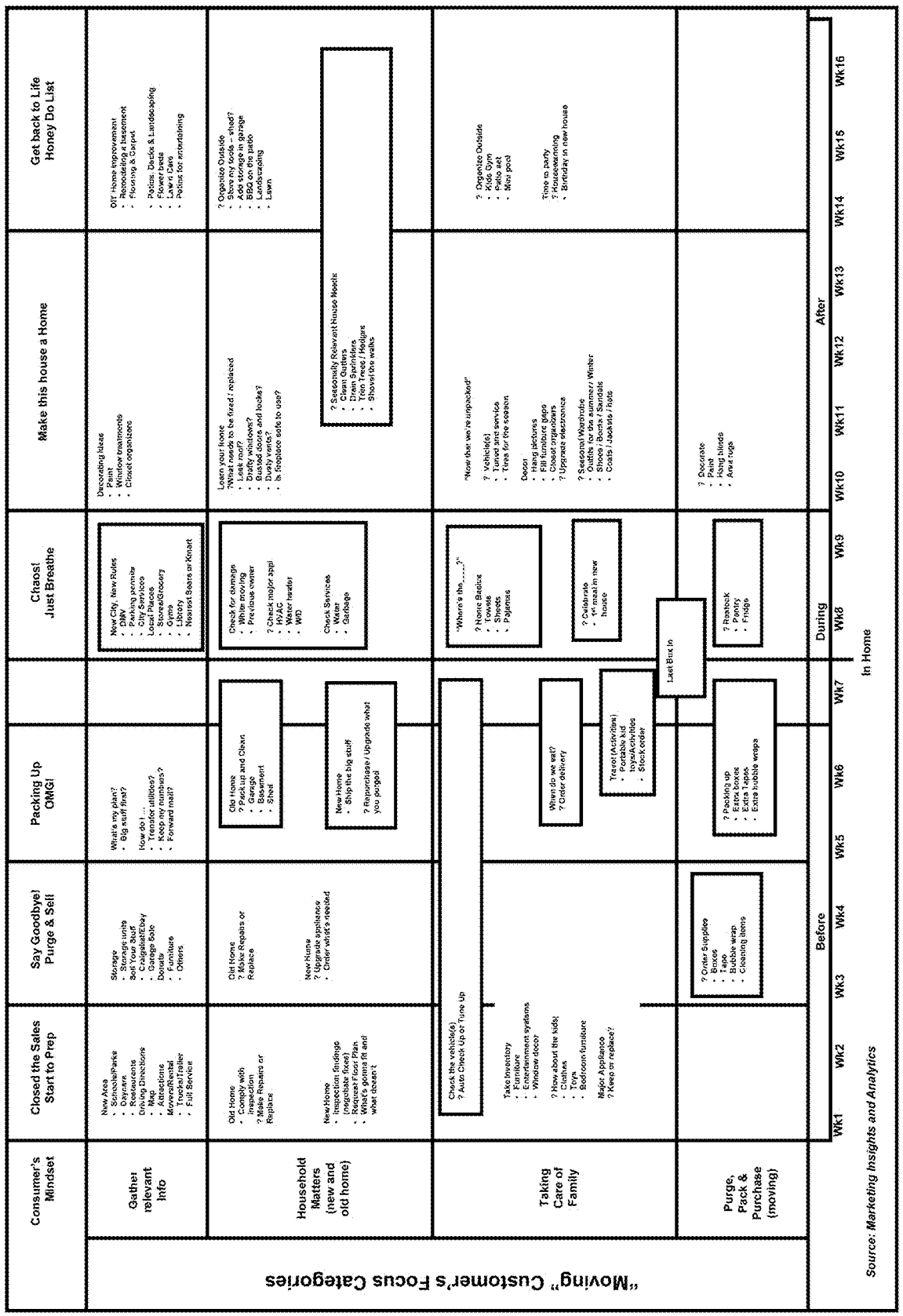
FIGS. 15 and 16 illustrate a decision matrix for sending targeted communications to a customer considering an exemplary life event of moving.
Figure 16:
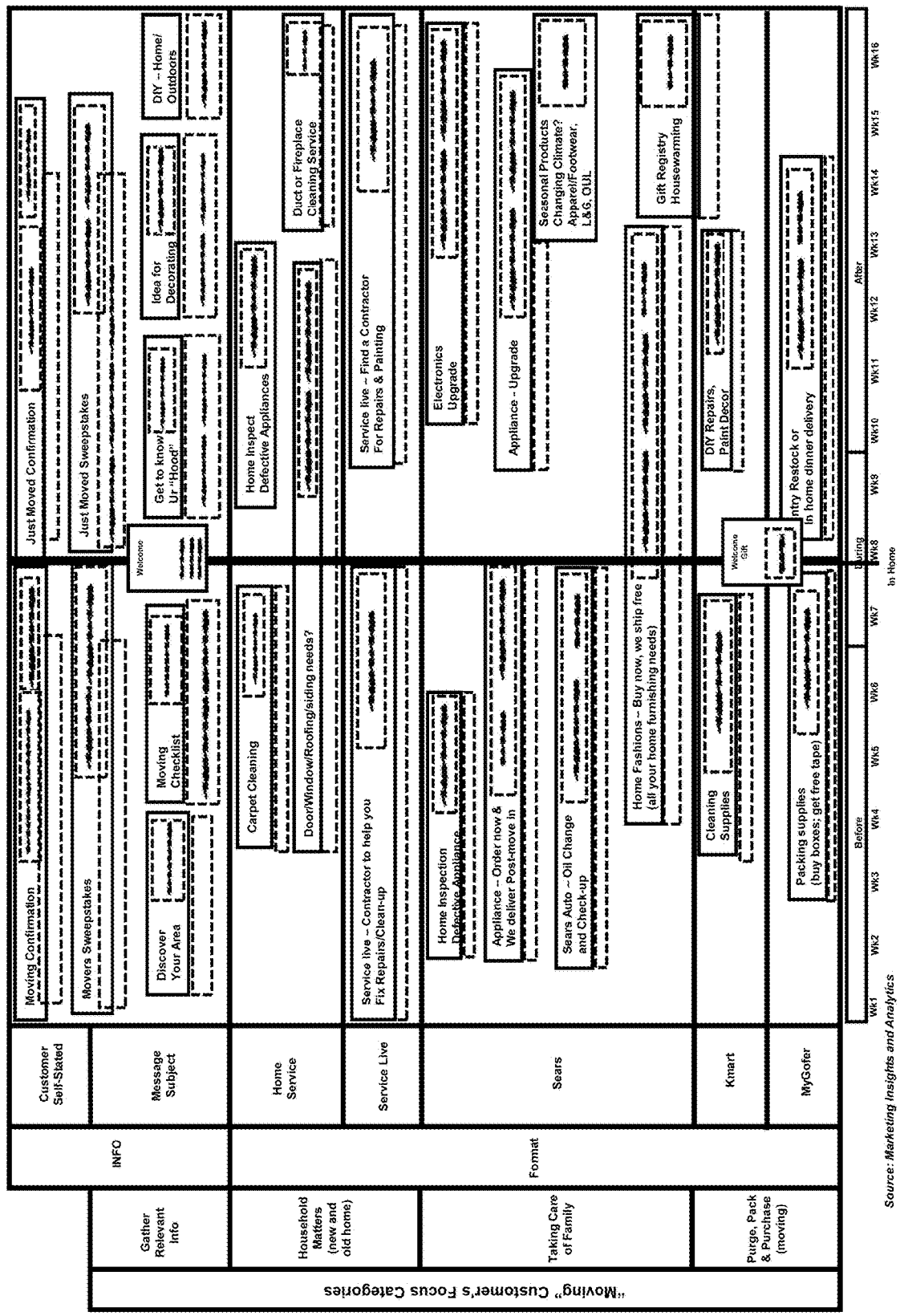

It is additionally contemplated that a customer that participates in the "shopping recap" experience may be provided with a follow-up communication, such as a sweepstakes entry or the like (which may be sent with a "shopping recap," a digital receipt, or otherwise), by which the system can obtain further data points with respect to a life event of the customer. For example, if a customer has indicated (as described previously) that they intend to move, the follow-up communication can seek to find where the customer is moving to, what type of home they are they are moving from and into, when they are moving, etc. With these additional data points, the system can then send targeted messages and/or offers to the customer as appropriate. Specifically, these data points can trigger the sending of targeted messages related to the locale into which the user is moving (e.g., stores located nearby, information generally relating to the area such as school information, tasks to be performed to when leaving their current home and upon arriving at their new home, and the like), offers for products the customer might need to assist in the move, might need in establishing a new household, and/or might otherwise need at their new locale given various conditions such as weather conditions at the new locale or the like (which communications would be sent at the appropriate time given their indicated move date), etc. Thus, data points collected in this manner can trigger the sending of relevant information/instructions, offers, incentives, and the like as shown in FIG. 16 based upon the perceived customer mindset/focus at various times during the course of any indicated life event as shown by in FIG. 15. As discussed previously, data points collected via any such additional exchanges with the customer will allow the system to maintain an ongoing dialog with the customer whereby the system may continually adjust to the needs and requirements of the customer.

From the foregoing it will be additionally appreciated that the "shopping recaps" and any purchases resulting therefrom may remain accessible to customers (e.g., to allow a customer to review their "stuff," access product warranties or user's manuals, etc.), may be integrated into other functional components provided by the system (e.g., to provide a customer with reminders that parts for purchased product need to be replaced or repaired), etc., and/or be viewed by sales associates (e.g., to review commissions earned, to send follow-ups, etc) as needed.

While various concepts have been described in detail, it will be appreciated by those skilled in the art that modifications and alternatives to those concepts could be developed in light of the overall teachings of the disclosure. For example, those of skill in the art will appreciate that the ordering of the steps described herein and illustrated in the figures can be modified without departing from the scope of the invention claimed hereinafter. Similarly, those of skill the art will appreciate that certain of the steps described herein may be considered to be optional. Yet further, while various aspects of the invention have been described in the context of functional modules and components, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of the modules used to perform the various described functions is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person knowledgeable in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

What is claimed is:

1. A system, the system comprising:
   a distributed environment comprising a plurality of processing devices linked via a local area network or wide area network, wherein one or more of the processing devices are designed to:
      receive information comprising data points gathered for a customer in real-time from in-store and online sources, utilizing a data processing engine to analyze and interpret the information,
      provide weights to the data points, using a scoring algorithm that quantifies their relevance to customer behavior,
      access a database of offers, wherein the database is structured for querying and retrieval of promotional content,
      provide weights to the offers according to historical performance data and customer preferences,
      determine an offer, to be provided to the customer, according to the weighted data points and the weighted offers, wherein the system dynamically adjusts offers according to real-time customer behavior across both in-store and online environments using an adaptive recommendation algorithm,
      provide an incentive program that synchronizes in-store activity and online activity by processing data, and
      generate a comprehensive and scalable view of the customer behavior according to the weighted data points, enabling customer profiling and targeted marketing strategies; and
   a first computing device operable to:
      receive a shopping recap having data indicative of one or more products shown to the customer by a sales person, wherein the shopping recap is linked to a first identifier that is associated with the customer and a second identifier that is associated with the sales person through a secure data linking mechanism that utilizes encrypted data packets and digital signatures for ensuring the integrity and security of the identifiers;
      provide a digital receipt to the customer for a purchased product, wherein the digital receipt is different from the shopping recap;
      award a commission to the sales person, if the customer purchases the product on the shopping recap;
      provide the customer with an incentive according to the in-store activity of the customer and the on-line activity of the customer, wherein the incentive is automatically redeemable, if the customer purchases a product associated with the incentive;
      link the incentive to a rewards program account associated with the; and
      send follow-up communications to the customer post-purchase, wherein:
         the follow-up communications comprise one or both of targeted messages related to products previously viewed and offers for related products,
         the related products are determined according to one or more of data points, life events and preferences gathered during the shopping experience,
         each of the plurality of processing devices is distinct from the first computing device,
         the plurality of processing devices comprises one or more servers, data storage units and network components, and
         the first computing device comprises a client terminal configured to manage customer interactions and facilitate secure communications with the processing devices via the network.

2. The system of claim 1, wherein the first computing device is operable to provide a graphical user interface to the customer to obtain data from the customer, wherein the data is usable to construct a message to the customer.

3. The system of claim 1, wherein the first computing device is operable to provide the customer with redeemable award points for the purchased product.

4. The system of claim 1, wherein the first computing device is operable to provide information relating to the product being purchased by the customer.

5. The system of claim 1, wherein the first computing device is operable to receive the shopping recap from a retailer point-of-sale device.

6. The system of claim 1, wherein the first computing device is operable to receive, from a second computing device, information relating to the product being purchased by the customer, wherein the second computing device is configured to link to the first computing device via the Internet.

7. The system of claim 1, wherein the commission is a full commission when the purchased product is a product that was shown to the customer by the sales person.

8. The system of claim 1, wherein the first computing device is operable to award a partial commission to the sales person, if the customer purchases a product related to a product on the shopping recap that is linked to the first identifier and the second identifier.

9. The system of claim 1, wherein a product, related to the one or more products shown to the customer by the sales person, is in a shopping recap report provided to the customer.

10. The system of claim 1, wherein a product, related to the one or more products shown to the customer by the sales person, is on a web page that includes at least one of the products shown to the customer by the sales person while the customer was within the retail establishment.

11. The system of claim 1, wherein a first computing device operable to make a shopping recap report available to the customer, wherein the shopping recap report lists the one or more products that were shown to the customer by the sales person while the customer was within a retail establishment.

12. The system of claim 11, wherein the shopping recap report is emailed to the customer.

13. The system of claim 11, wherein the shopping recap report is accessible via a smart phone application.

14. The system of claim 1, wherein the digital receipt is provided to the customer via a smart phone application.

15. The system of claim 1, wherein the incentive is selected from a repository of incentives.

16. The system of claim 1, wherein the incentive includes a coupon.

17. The system of claim 1, wherein the incentive is based on in-store activity or on-line activity of the customer.

18. The system of claim 1, wherein the incentive is accessible via a smart phone application.

19. The system of claim 1, wherein the incentive is redeemable award points for the purchased product.

20. The system of claim 1, wherein the incentive is automatically linked to a rewards program account associated with the customer.

* * * * *